(No Model.)
P. TIEDGE.
GRILLE FOR DOOR OR WINDOW OPENINGS.
No. 509,971. Patented Dec. 5, 1893.
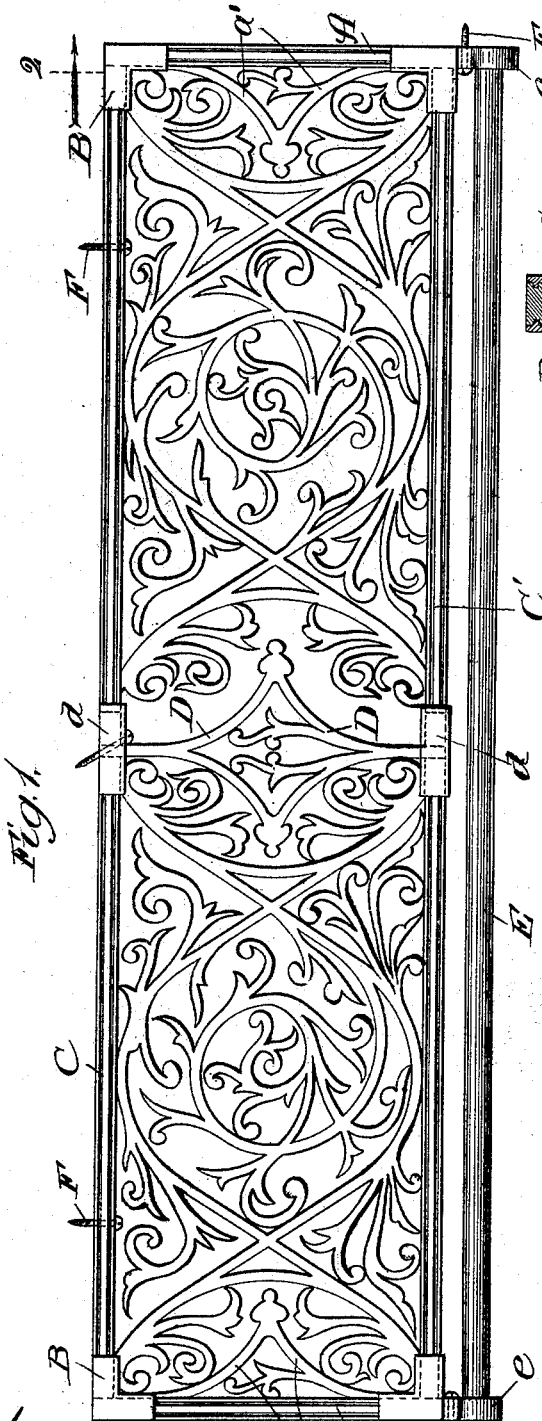
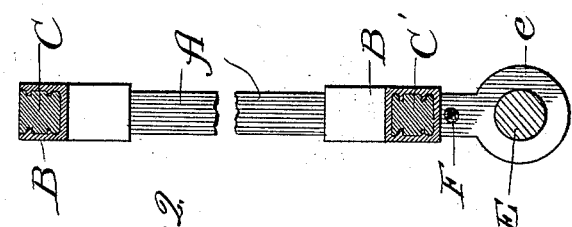
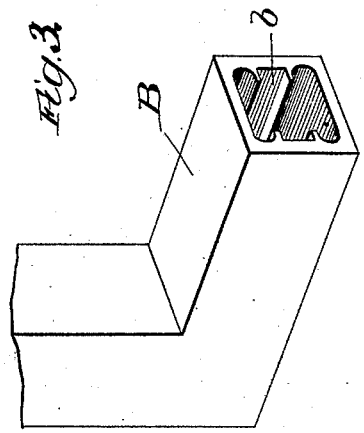
Witnesses:
Chas. E. Gaylord
E. R. Shipley.
Inventor:
Peter Tiedge,
By Benning & Benning & Payson,
Attys.

UNITED STATES PATENT OFFICE.

PETER TIEDGE, OF CHICAGO, ILLINOIS.

GRILL FOR DOOR OR WINDOW OPENINGS.

SPECIFICATION forming part of Letters Patent No. 509,971, dated December 5, 1893.

Application filed July 21, 1893. Serial No. 481,143. (No model.)

*To all whom it may concern:*

Be it known that I, PETER TIEDGE, a citizen of the United States, residing at Chicago, Illinois, have invented certain new and useful Improvements in Grills for Door or Window Openings, of which the following is a specification.

The object of my invention is to provide a grill of such construction that it can be easily adjusted to fit different sized openings above doors or windows; and it consists in the details, combinations and arrangements hereinafter described and claimed.

In the drawings, Figure 1 is a front elevation showing my improved grill; Fig. 2 a sectional view taken on the line 2 of Fig. 1; and Fig. 3 a perspective detail of one of the corner boxes.

In the manufacture of grills as carried on at present, they are made of different sizes to correspond to regular sized openings above the door; but as the size of the openings above the door vary, it is impossible to carry a stock of grills to fit these different sized openings; and, as a consequence, much time, labor and expense are entailed in fitting the grills to the different sized openings. To obviate these objections, as well as provide a simple, efficient and economical grill that may be adjusted to fit different sized openings, and to enable the manufacturer to make and carry a large stock of the same at any one time, is the principal design of my invention.

In constructing my improved grill, as illustrated in the drawings, I provide the usual end pieces A, with preferably metallic corner boxes B. The corner boxes are secured firmly to the end strips of the grill, and are provided with longitudinal openings, $b$, of a size and shape adapted to receive easily the upper and lower strips, C and C', forming the frame, and supporting the other portions of the grill or fretwork in place. To the end strips, A, is secured a portion of the grill work, as at $a'$, so that during the adjustment of the upper and lower side strips, these will remain stationary. The main portion of the grill work, which is held in place by the upper and lower strips C and C', may be divided into a number of parts, so as to give any desired amount of adjustment in the length of the grill; but I prefer to divide the entire grill into five parts. I cut the body of the grill-work in two, and interpose at the central portion of the same a portion of the grill-work D, and at the upper and lower sides of the same I provide metal sliding boxes $d$, provided with longitudinal openings, of a size and shape adapted to receive the side pieces C and C', and allow the same to be pushed in or out to the desired position. I provide the usual curtain pole E, which may be supported in position by the usual end brackets $e$.

In fitting my improved grill in position, the end pieces are first placed in position, when the main body of the grill can be closed to its least extent, and one pair of ends inserted in the corner boxes in such manner that there is sufficient room to push the other ends into position in the opposite corner boxes. The central piece can be then located midway, so as to present a harmonious appearance to the entire fretwork. The screws F may then be screwed into the door or window casing, thus serving to hold the entire grill firmly in position.

While I have entered into a more or less minute description regarding the details of my invention, I do not desire to be limited thereto unduly any more than is pointed out in the claims. On the contrary, I contemplate changes in form, construction and arrangement, and the use of equivalents as occasion may warrant or necessity demand.

I claim—

1. A grill composed of several sections, comprising boxes adapted to telescopically hold the frame of the grill in position, substantially as described.

2. A grill composed of several sections, comprising boxes adapted to telescopically hold the frame of the grill in position, and means for securing the frame to a casing, substantially as described.

3. A grill composed of several sections, comprising corner boxes firmly secured to the end pieces and provided with longitudinal openings, and frame-work adapted to enter the openings in the boxes and be held in position thereby, substantially as described.

4. A grill composed of several sections, comprising corner boxes firmly secured to the end pieces and provided with longitudinal openings, a central piece provided with boxes having longitudinal openings, and frame-work between the central and end boxes adapted to enter the openings in said boxes and be held in position thereby, substantially as described.

PETER TIEDGE.

Witnesses:
THOMAS F. SHERIDAN,
FREDRICK H. GERCKEN, Jr.